United States Patent
Kondo et al.

(10) Patent No.: US 11,953,071 B2
(45) Date of Patent: Apr. 9, 2024

(54) FLUID-FILLED VIBRATION DAMPING DEVICE

(71) Applicant: SUMITOMO RIKO COMPANY LIMITED, Komaki (JP)

(72) Inventors: Hiroki Kondo, Komaki (JP); Kenji Oki, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 553 days.

(21) Appl. No.: 17/325,269

(22) Filed: May 20, 2021

(65) Prior Publication Data

US 2021/0270344 A1 Sep. 2, 2021

Related U.S. Application Data

(63) Continuation of application No. PCT/JP2019/015348, filed on Apr. 8, 2019.

(51) Int. Cl.
*F16F 13/08* (2006.01)
*F16F 13/10* (2006.01)

(52) U.S. Cl.
CPC ...... *F16F 13/106* (2013.01); *F16F 2224/025* (2013.01)

(58) Field of Classification Search
CPC .. F16F 3/106; F16F 2224/025; B60K 5/1208; B60K 5/1283
See application file for complete search history.

(56) References Cited

U.S. PATENT DOCUMENTS

| 4,742,999 | A | * | 5/1988 | Flower | F16F 13/106 |
| | | | | | 188/320 |
| 5,443,245 | A | * | 8/1995 | Bellamy | F16F 13/106 |
| | | | | | 267/140.13 |
| 8,556,239 | B2 | | 10/2013 | Okumura et al. | |
| 9,334,922 | B2 | | 5/2016 | Okumura | |
| 9,816,580 | B2 | | 11/2017 | Hayashi | |
| 2009/0140476 | A1 | | 6/2009 | Michiyama et al. | |

(Continued)

FOREIGN PATENT DOCUMENTS

JP 2016-138571 A 8/2016

OTHER PUBLICATIONS

Jul. 2, 2019 International Search Report issued in Internaitonal Patent Application No. PCT/JP2019/015348.

*Primary Examiner* — Bradley T King
(74) *Attorney, Agent, or Firm* — Oliff PLC

(57) ABSTRACT

A fluid-filled vibration damping device including a partition having a housing area, and a movable film housed in the housing area while including a central retainer held by the partition and spoke-shaped retainers extending radially outward from the central retainer. A first surface of the movable film is overlapped on a wall inner surface of the housing area. An elastic deformation zone provided circumferentially between the spoke-shaped retainers is allowed to deform in a direction away from the wall inner surface, and includes a cushion ridge projecting from a second surface of the movable film while extending radially outward from the central retainer. A height of the cushion ridge is varied in a direction of extension such that a timing of contact with an opposing wall inner surface in the housing area varies depending on an amount of deformation of the elastic deformation zone.

8 Claims, 8 Drawing Sheets

(56) References Cited

U.S. PATENT DOCUMENTS

| | | | | |
|---|---|---|---|---|
| 2010/0201053 A1* | 8/2010 | Okumura | ............... | F16F 13/106 |
| | | | | 267/140.13 |
| 2013/0154171 A1* | 6/2013 | Nishi | ..................... | F16F 13/106 |
| | | | | 267/140.13 |
| 2015/0069686 A1* | 3/2015 | Okumura | ............... | F16F 13/106 |
| | | | | 267/140.13 |
| 2016/0195154 A1* | 7/2016 | Komiya | ................. | F16F 13/106 |
| | | | | 267/140.13 |
| 2016/0273610 A1* | 9/2016 | Hayashi | ................ | F16F 13/106 |
| 2017/0023088 A1* | 1/2017 | Kadowaki | .............. | F16F 13/106 |
| 2021/0316603 A1* | 10/2021 | Kim | ...................... | B60K 5/1283 |
| 2021/0381576 A1* | 12/2021 | Le Corre | ............... | F16F 13/106 |
| 2023/0020695 A1* | 1/2023 | Kuroda | .................... | B60K 5/12 |

\* cited by examiner

… (1) …

FLUID-FILLED VIBRATION DAMPING DEVICE

INCORPORATED BY REFERENCE

This application is a Continuation of International Application No. PCT/JP2019/015348 filed Apr. 8, 2019, the disclosure of which is expressly incorporated herein by reference in its entirety.

BACKGROUND OF THE INVENTION

1. Field of the Invention

The present invention relates to a fluid-filled vibration damping device used for an automotive engine mount or the like.

2. Description of the Related Art

Conventionally, there is known a vibration damping device that is interposed between constituent components of a vibration transmission system and connects the constituent components of the vibration transmission system to each other in a vibration damping manner. As a kind of the vibration damping device, a fluid-filled vibration damping device has also been known. The fluid-filled vibration damping device includes a first fluid chamber and a second fluid chamber partitioned by a partition, and flow of a fluid will be produced between the first fluid chamber and the second fluid chamber, for example, thereby obtaining an excellent vibration damping effect.

Meanwhile, for the purpose of improving vibration damping ability and preventing cavitation noise or the like, there has been proposed a structure in which a movable film is disposed in a housing area provided in a partition. For example, U.S. Publication No. US 2009/0140476 discloses a structure including a movable rubber film for reducing cavitation noise. One surface of the movable rubber film of US 2009/0140476 is overlapped and disposed on a wall inner surface of a housing area, and the movable rubber film is allowed to deform in a direction away from the wall inner surface of the housing area on which the movable rubber film is overlapped.

SUMMARY OF THE INVENTION

However, as a result of further examination of US 2009/0140476, the present inventors have found that there is still room for improvement about occurrence of striking noises due to the other surface of the movable film being struck against the wall inner surface of the housing area when the movable film undergoes large elastic deformation.

It is therefore one object of this invention to provide a fluid-filled vibration damping device of novel structure which is able to further reduce striking noises due to striking of a movable film when an external force such as vibration and impact load is applied.

The above and/or optional objects of this invention may be attained according to at least one of the following preferred embodiments of the invention. The following preferred embodiments and/or elements employed in each preferred embodiment of the invention may be adopted at any possible optional combinations.

A first preferred embodiment provides a fluid-filled vibration damping device comprising: a first fluid chamber; a second fluid chamber; a partition having a housing area and arranged between the first fluid chamber and the second fluid chamber; and a movable film having a first surface and a second surface while being housed in the housing area, the movable film comprising: a central retainer sandwiched and held by the partition; a plurality of spoke-shaped retainers extending radially outward from the central retainer, the first surface of the movable film being held in a state of being overlapped on a wall inner surface of the housing area of the partition by the central retainer and the spoke-shaped retainers; an elastic deformation zone provided circumferentially between the spoke-shaped retainers, the elastic deformation zone being allowed to deform in a direction away from the wall inner surface of the housing area on which the movable film is overlapped based on a differential of fluid pressures applied to the first surface and the second surface of the movable film; and a cushion ridge provided in the elastic deformation zone, the cushion ridge projecting from the second surface of the movable film while extending radially outward from the central retainer, wherein a projection height of the cushion ridge is varied in a direction of extension of the cushion ridge such that a timing of contact with an opposing wall inner surface in the housing area varies depending on an amount of deformation of the elastic deformation zone.

According to the fluid-filled vibration damping device structured following the present preferred embodiment, when the elastic deformation zone of the movable film deforms and the second surface of the elastic deformation zone strikes the wall inner surface of the housing area, the cushion ridge provided in the elastic deformation zone comes into contact with the wall inner surface. This prevents the elastic deformation zone from coming into planar contact with the wall inner surface over a wide range, thereby reducing striking noises. Moreover, the cushion ridge does not come into contact with the wall inner surface of the housing area in its entirety at the same time, but realizes stepwise contact. By so doing, when the projecting distal end face of the cushion ridge comes into contact with the wall inner surface of the housing area, it is also possible to prevent a large load from acting on the partition at one time, thereby suppressing the striking noises due to striking of the cushion ridge as well.

A second preferred embodiment provides the fluid-filled vibration damping device according to the first preferred embodiment, wherein the movable film further comprises an outer peripheral retainer provided in an outer peripheral portion thereof while extending in a circumferential direction, the outer peripheral retainer being sandwiched and held by the partition, and the spoke-shaped retainers connect the central retainer and the outer peripheral retainer.

According to the fluid-filled vibration damping device structured following the present preferred embodiment, the radially inner portion of the movable film is supported by the partition at the central retainer, and the outer peripheral portion of the movable film is supported by the partition at the outer peripheral retainer. This limits the amount of deformation of the elastic deformation zone provided between the central retainer and the outer peripheral retainer, thereby reducing the striking noises due to striking of the elastic deformation zone.

By providing the spoke-shaped retainer so as to connect the central retainer and the outer peripheral retainer, the deformation rigidity of the movable film is surely obtained in the portion away from the elastic deformation zone.

A third preferred embodiment provides the fluid-filled vibration damping device according to the first or second preferred embodiment, wherein the projection height of the cushion ridge decreases in a stepwise manner toward a radially outer side of the movable film.

According to the fluid-filled vibration damping device structured following the present preferred embodiment, when the elastic deformation zone of the movable film deforms, the cushion ridge of the movable film comes into contact with the wall inner surface in a stepwise manner in the order from the radially inner portion having a large projection height to the outer peripheral portion having a small projection height. By so doing, the contact area of the projecting distal end face of the cushion ridge with respect to the wall inner surface of the housing area gradually increases. Thus, an excellent cushioning action is exhibited, thereby preventing the striking noises due to striking of the movable film.

A fourth preferred embodiment provides the fluid-filled vibration damping device according to any one of the first through third preferred embodiments, wherein the movable film further comprises an outer peripheral retainer provided partially in an outer peripheral portion thereof while extending in a circumferential direction, the outer peripheral retainer being sandwiched and held by the partition, and the cushion ridge extends from the central retainer toward a portion circumferentially away from the outer peripheral retainer.

According to the fluid-filled vibration damping device structured following the present preferred embodiment, the cushion ridge extends toward a portion which is free from the outer peripheral retainer where the amount of elastic deformation is likely to be large. This configuration makes it possible to prevent the striking noises due to striking of the movable film circumferentially between the outer peripheral retainers.

A fifth preferred embodiment provides the fluid-filled vibration damping device according to any one of the first through fourth preferred embodiments, wherein the first fluid chamber comprises a pressure-receiving chamber that gives rise to internal pressure fluctuations during an input of vibration, while the second fluid chamber comprises an equilibrium chamber that permits changes in volume, and the movable film is overlapped on the wall inner surface on a side of the equilibrium chamber in the housing area, while the elastic deformation zone of the movable film is remote from the opposing wall inner surface on a side of the pressure-receiving chamber in the housing area.

According to the fluid-filled vibration damping device structured following the present preferred embodiment, when the fluid pressure in the pressure-receiving chamber suddenly drops significantly, the elastic deformation zone of the movable film deforms toward the pressure-receiving chamber side, so that the drop of the fluid pressure in the pressure-receiving chamber is immediately ameliorated. This avoids generation of cavitation bubbles due to a significant drop of the fluid pressure in the pressure-receiving chamber, thereby preventing noises generated when the cavitation bubbles disappear.

A sixth preferred embodiment provides the fluid-filled vibration damping device according to any one of the first through fifth preferred embodiments, wherein the movable film has a quadrangular plate shape.

According to the fluid-filled vibration damping device structured following the present preferred embodiment, for example, in the fluid-filled vibration damping device having quadrangular plate contours, by the movable film having a quadrangular plate shape of quadrangular contours as well, it is possible to obtain a large acting area of the fluid pressure on the movable film. In the case where the movable film has a rectangular plate shape, for example, by providing the cushion ridge so as to extend in the major axis direction in which the amount of deformation is likely to be large, deformation of the elastic deformation zone is greatly allowed, thereby preventing generation of the striking noises while attaining improvement in vibration damping ability and prevention of cavitation noises.

A seventh preferred embodiment provides the fluid-filled vibration damping device according to any one of the first through fifth preferred embodiments, wherein the movable film has a circular disk shape.

According to the fluid-filled vibration damping device structured following the present preferred embodiment, the change in deformation rigidity in the thickness direction of the movable film is small in the circumferential direction, thereby enabling the movable film to deform in a balanced manner.

An eighth preferred embodiment provides the fluid-filled vibration damping device according to any one of the first through seventh preferred embodiments, wherein a cushion protrusion is provided in the elastic deformation zone, the cushion protrusion being independent of the central retainer and the cushion ridge.

According to the fluid-filled vibration damping device structured following the present preferred embodiment, the striking noises caused by the movable film striking the wall inner surface of the housing area are reduced by the cushion protrusion as well. In particular, the cushion protrusion may be configured to strike the wall inner surface of the housing area at timing different from the contact of the cushion ridge, at the projecting distal end faces having different heights, with respect to the partition. By so doing, contact in more steps is realized, thereby further reducing the striking noises.

According to the present invention, it is possible to reduce the striking noises due to striking of the movable film.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein:

FIGS. 7A-7C are enlarged cross sectional views of a principal part showing modes of deformation of the movable film of the engine mount of FIG. 1, wherein FIG. 7A shows a stationary state, FIG. 7B shows a state of contact of a first contact part with an upper wall inner surface of a housing area, and FIG. 7C shows a state of contact of a second contact part with the upper wall inner surface of the housing area;

DETAILED DESCRIPTION OF EMBODIMENTS

Hereinafter, practical embodiments of the present disclosure will be described with reference to the drawings.

Figure 1:
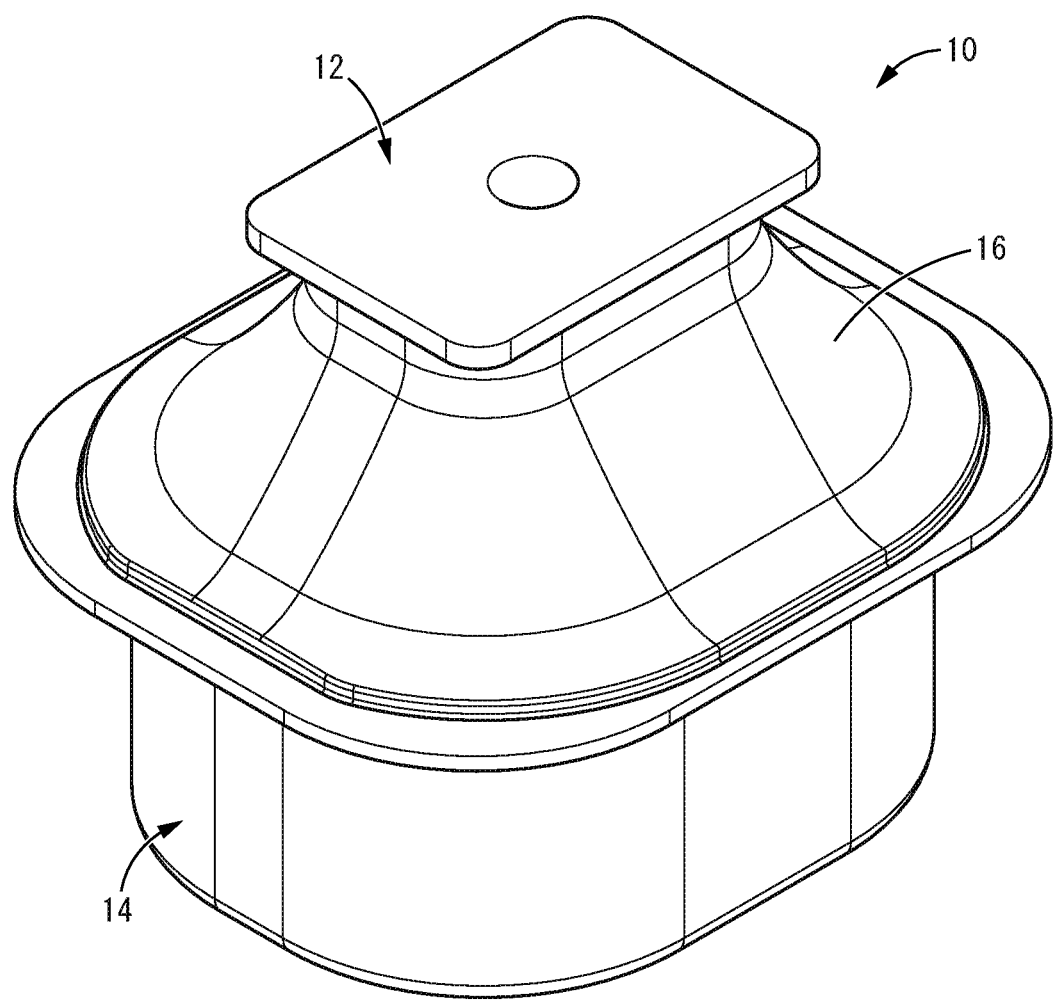
FIG. 1 is a perspective view showing a fluid-filled vibration damping device in the form of an engine mount according to a first practical embodiment of the present invention.
Figure 2:
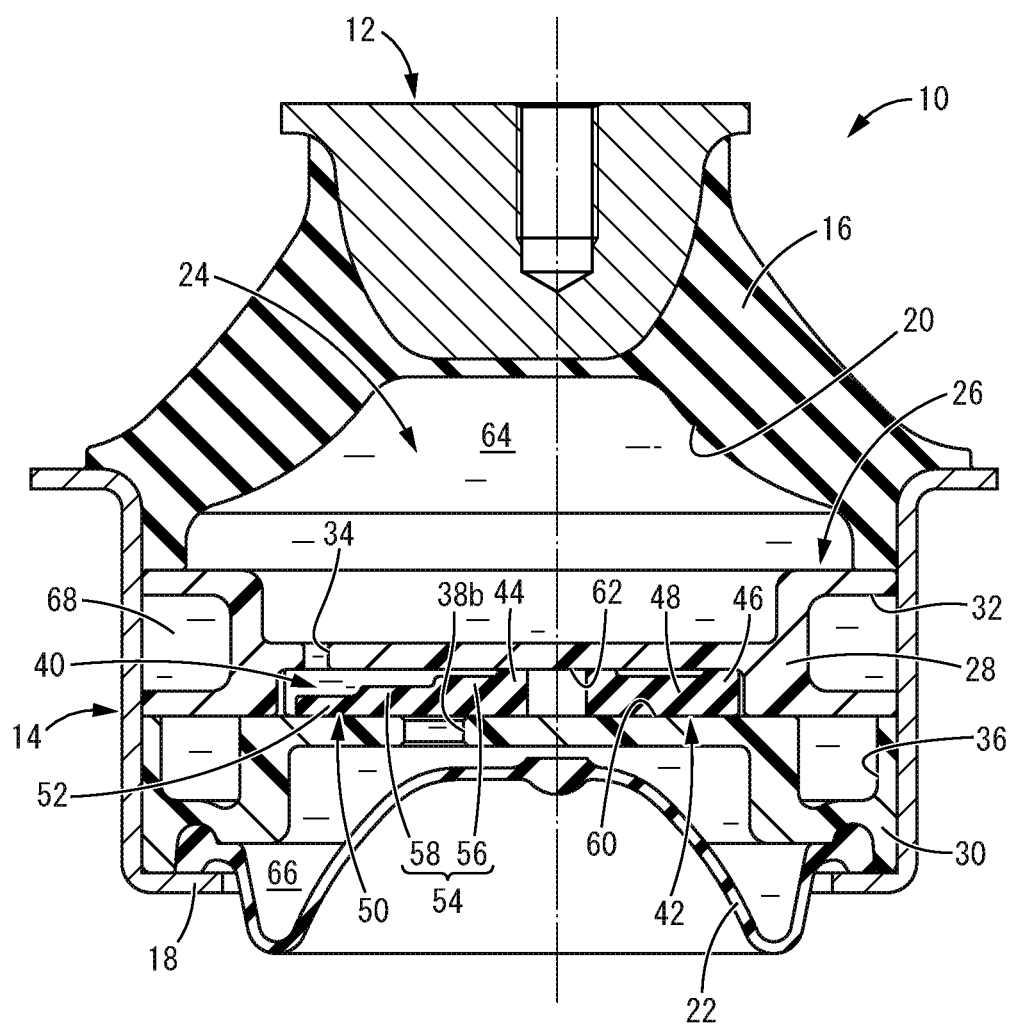
FIG. 2 is a cross sectional view of the engine mount shown in FIG. 1.

FIGS. 1 and 2 depict an automotive engine mount 10 according to a first practical embodiment of a fluid-filled vibration damping device constructed following the present disclosure. The engine mount 10 has a structure in which a first mounting member 12 and a second mounting member 14 are connected by a main rubber elastic body 16. In the following description, as a general rule, the vertical direction refers to the vertical direction in FIG. 2, which coincides with the center axis direction of the engine mount 10.

The first mounting member 12 is a solid block-shaped member having a roughly rectangular cross-sectional shape with rounded corners and extending in the vertical direction. The first mounting member 12 has a tapered shape whose outer peripheral surface slopes radially inward toward the bottom, and whose cross-sectional area gradually decreases toward the bottom.

The second mounting member 14 is a tubular member having a roughly rectangular cross-sectional shape with rounded corners and extending in the vertical direction. The lower end portion of the second mounting member 14 serves as a clasping part 18 protruding radially inward about the entire circumference.

The first mounting member 12 and the second mounting member 14, which are arranged apart from each other in the vertical direction on roughly the same center axis, are elastically connected to each other by the main rubber elastic body 16. The main rubber elastic body 16 has a frustum shape whose diameter increases downward, and the first mounting member 12 is bonded by vulcanization to the upper end thereof which is the small-diameter side end, while the second mounting member 14 is bonded by vulcanization to the lower end thereof which is the large-diameter side end. The main rubber elastic body 16 includes a recess 20 opening onto its lower surface. The recess 20 has a tapered shape whose circumferential wall inner surface increases in diameter toward the bottom. Due to the formation of the recess 20, the main rubber elastic body 16 has a tapered cross-sectional shape that slopes radially outward toward the bottom.

The second mounting member 14 supports a flexible film 22. The flexible film 22 is a thin rubber film that can easily undergo flexural deformation, and its center portion has a dome shape. The outer peripheral end of the flexible film 22 is continuously supported about the entire circumference by the clasping part 18 of the second mounting member 14 protruding radially inward.

Vertically between the main rubber elastic body 16 and the flexible film 22, there is formed a fluid sealing area 24 filled with a non-compressible fluid or liquid. While no particular limitation is imposed as to the non-compressible fluid sealed in the fluid sealing area 24, examples are water, ethylene glycol, or the like, and preferably a low-viscosity fluid having viscosity of 0.1 Pa·s or lower is adopted. The non-compressible fluid may be a single liquid or a mixture.

A partition 26 is housed in the fluid sealing area 24. The partition 26 includes a first partition plate 28 and a second partition plate 30.

The first partition plate 28 is a rigid member made of metal, synthetic resin, or the like, and has a roughly rectangular plate shape with rounded corners. The first partition plate 28 has a vertical thickness dimension made larger in the outer peripheral portion than in the radially inner portion. The thin-walled radially inner portion of the first partition plate 28 is connected to the vertically middle portion of the thick-walled outer peripheral portion. The first partition plate 28 includes a first circumferential groove 32 formed in the thick-walled outer peripheral portion. The first circumferential groove 32 opens onto the outer peripheral surface of the first partition plate 28, and extends in the outer peripheral end of the first partition plate 28 in the circumferential direction for a length shorter than once around the circumference. The first partition plate 28 further includes a plurality of upper through-holes 34 penetrating the thin-walled radially inner portion in the vertical direction. The upper through-holes 34 are provided, for example, with roughly the same size and shape, and in roughly the same number as those of lower through-holes 38a, 38b described later.

The second partition plate 30 is a rigid member made of metal, synthetic resin, or the like, and has a roughly rectangular plate shape with rounded corners. The second partition plate 30 has a vertical thickness dimension made larger in the outer peripheral portion than in the radially inner portion. The thin-walled radially inner portion of the second partition plate 30 is connected to the upper end of the thick-walled outer peripheral portion. The second partition plate 30 includes a second circumferential groove 36 formed in the thick-walled outer peripheral portion. The second circumferential groove 36 opens onto the upper surface of the second partition plate 30, and extends in the outer peripheral portion of the second partition plate 30 in the circumferential direction for a length shorter than once around the circumference.

Figure 3:
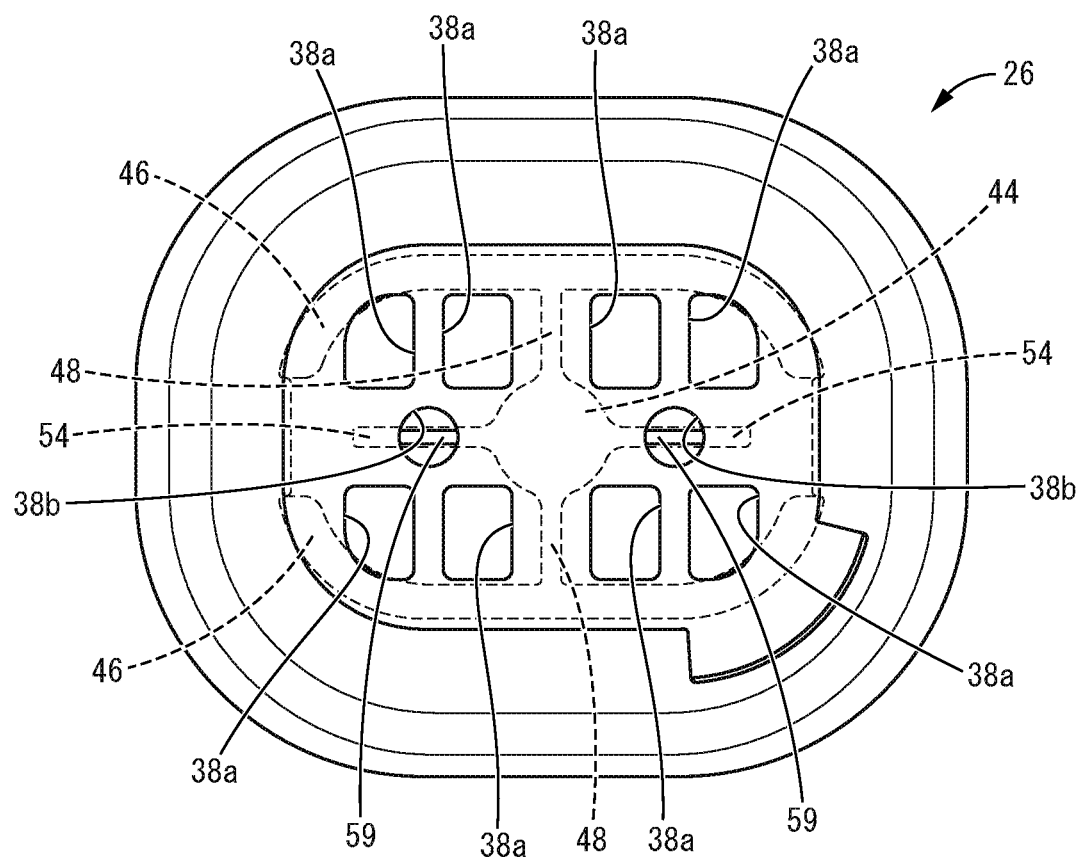
FIG. 3 is a bottom plan view of a partition of the engine mount shown in FIG. 2.

The second partition plate 30 further includes a plurality of first lower through-holes 38a penetrating the thin-walled radially inner portion in the vertical direction. As shown in FIG. 3, four first lower through-holes 38a are provided side by side in the long-side direction (the left-right direction in FIG. 3) of the second partition plate 30, and are arranged in two rows in the short-side direction (the vertical direction in FIG. 3) of the second partition plate 30. Thus, a total of eight first lower through-holes 38a are formed. Moreover, in the center of the second partition plate 30 in the short-side direction, two second lower through-holes 38b are separately provided at the locations that are remote from each other in the long-side direction.

The first partition plate 28 and the second partition plate 30 are overlapped on each other in the vertical direction. A housing area 40 is formed between opposed faces of the radially inner portion of the first partition plate 28 and the radially inner portion of the second partition plate 30 which are overlapped in the vertical direction.

Figure 4:
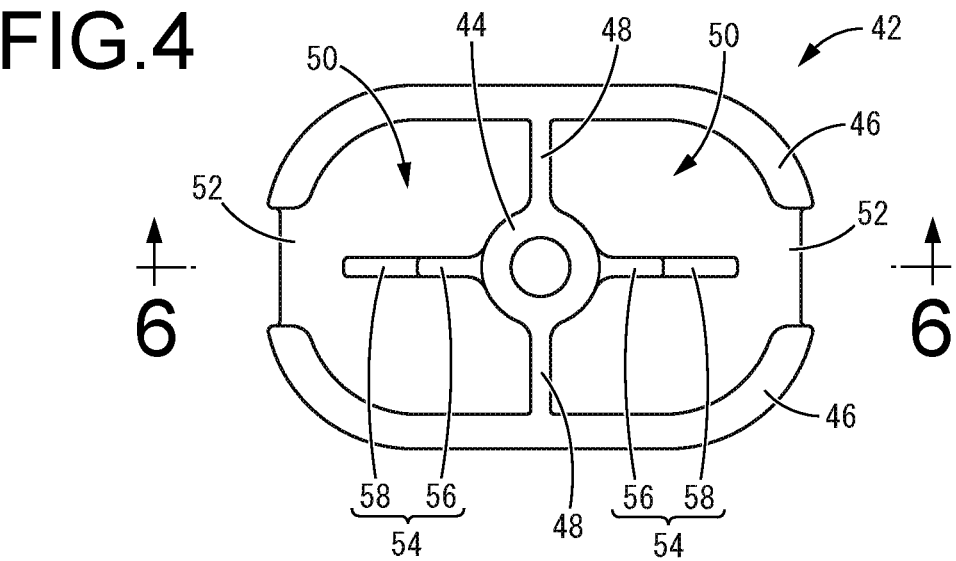
FIG. 4 is a top plan view of a movable film of the partition shown in FIG. 3.
Figure 5:
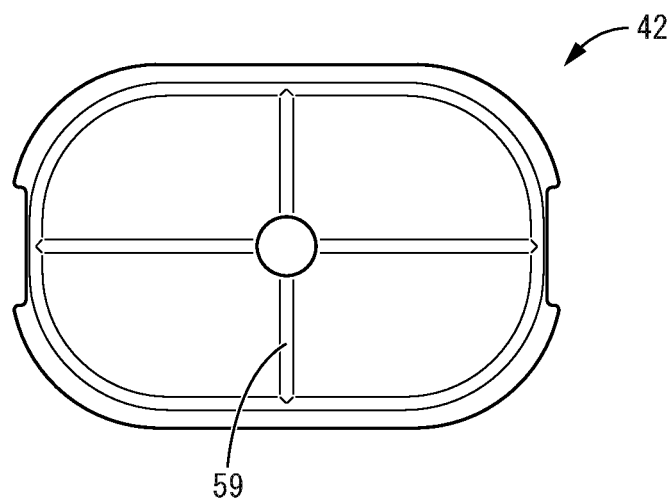
FIG. 5 is a bottom plan view of the movable film shown in FIG. 4.
Figure 6:
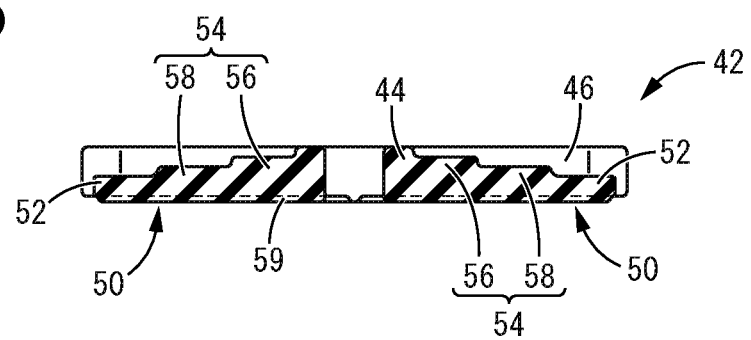
FIG. 6 is a cross sectional view taken along line 6-6 of FIG. 4.

A movable film 42 is disposed in the housing area 40 of the partition 26. The movable film 42 is formed by a rubber elastic body and can undergo elastic bending deformation in the thickness direction. As shown in FIGS. 4 to 6, the movable film 42 has a roughly quadrangular (rectangular) plate shape with rounded corners overall.

A central retainer 44 of round tubular shape projecting upward is integrally formed with the radially inner portion of the movable film 42. Besides, a pair of outer peripheral retainers 46, 46 projecting upward are integrally formed with the outer peripheral end of the movable film 42. The pair of outer peripheral retainers 46, 46 each extend in the circumferential direction with a length less than half the circumference, and are provided on opposite sides of the movable film 42 in the short-side direction (the vertical direction in FIG. 4). The pair of outer peripheral retainers 46, 46 are remote from each other at their two circumferential ends, and are partially provided in the circumferential direction at the outer peripheral end of the movable film 42.

A plurality of spoke-shaped retainers 48 extending radially outward from the central retainer 44 are provided between the central retainer 44 and the outer peripheral retainer 46. The spoke-shaped retainer 48 projects upward in the movable film 42. The spoke-shaped retainers 48 are provided in a pair extending from the central retainer 44 toward the outer peripheral retainer 46 toward the opposite sides in the short-side direction. One end of the spoke-shaped retainer 48 in the short-side direction is connected to the central retainer 44, and the other end thereof is connected to the outer peripheral retainer 46, so that the spoke-shaped retainer 48 connects the central retainer 44 and the outer peripheral retainer 46. The projection height dimension of the spoke-shaped retainer 48 is smaller than that of the central retainer 44 and the outer peripheral retainer 46.

In plan view of the movable film 42, the portion away from the central retainer 44, the outer peripheral retainers 46, 46, and the spoke-shaped retainers 48, 48 serves as an elastic deformation zone 50. The elastic deformation zones 50 are provided circumferentially between the outer peripheral retainers 46, 46 and circumferentially between the spoke-shaped retainers 48, 48. The elastic deformation zones 50 of the present practical embodiment are provided on opposite sides in the long-side direction with respect to the central retainer 44 and the spoke-shaped retainers 48, 48. In the elastic deformation zones 50, the outer peripheral ends located circumferentially between the pair of outer peripheral retainers 46, 46 serve as relief parts 52, 52.

Each elastic deformation zone 50 includes a cushion ridge 54. The cushion ridge 54 projects upward in the elastic deformation zone 50 and extends radially outward from the central retainer 44. The cushion ridges 54 of the present practical embodiment are provided in a pair extending from the central retainer 44 toward the opposite sides in the long-side direction of the movable film 42. The pair of cushion ridges 54, 54 extend toward the respective relief parts 52, 52, which are the portions circumferentially away from the pair of outer peripheral retainers 46, 46. The cushion ridge 54 does not reach the relief part 52 provided at the outer peripheral end of the elastic deformation zone 50, but is provided from the radially inner end of the elastic deformation zone 50 to the middle portion in the long-side direction. It is desirable that the cushion ridge 54 be provided so as to extend for a length of half or more with respect to the length in the long-side direction of the elastic deformation zone 50 including the relief part 52. The projection height dimension of the cushion ridge 54 is smaller than that of the central retainer 44 and the outer peripheral retainer 46.

As shown in FIG. 6, the cushion ridge 54 has a projection height dimension that is varied stepwise in two steps, and includes a first contact part 56 and a second contact part 58 that have projection height dimensions different from each other. The first contact part 56 is provided on the radially inner portion of the elastic deformation zone 50, and its radially inside end is connected to the central retainer 44. The second contact part 58 is provided on the outer peripheral portion of the elastic deformation zone 50, and has a projection height dimension smaller than that of the first contact part 56. With this configuration, the projection height dimension of the cushion ridge 54 decreases in a stepwise manner from the central retainer 44 toward a radially outer side. The first contact part 56 and the second contact part 58 are each provided with a roughly constant projection height dimension, and their projecting distal end faces each comprise an approximately flat surface extending roughly orthogonally to the center axis of the central retainer 44.

The movable film 42 includes a seal lip 59 projecting downward. As shown in FIG. 5, the seal lip 59 extends annularly in continuous fashion about the entire circumference in the outer peripheral portion of the movable film 42, and extends from the radially inner end of the movable film 42 in the short-side direction and in the long-side direction.

As shown in FIG. 2, the movable film 42 constructed in the above manner is housed in the housing area 40 between the first partition plate 28 and the second partition plate 30. The movable film 42 is arranged such that the central retainer 44 and the outer peripheral retainers 46 are vertically sandwiched and held between the first partition plate 28 and the second partition plate 30. As shown in FIG. 2, the upper surface of the elastic deformation zone 50 of the movable film 42 is remote at a predetermined distance from an upper wall inner surface 62 of the housing area 40.

The movable film 42 is arranged such that the central retainer 44 and the outer peripheral retainers 46 are clasped, and is reinforced by the spoke-shaped retainers 48. By so doing, the lower surface of the movable film 42 is overlapped in a state of contact on a lower wall inner surface 60 of the housing area 40 at least at the seal lip 59. The seal lip 59 is provided such that the annular portion extending in the circumferential direction in the outer peripheral portion of the movable film 42 surrounds the radially outer side of the movable film 42 with respect to the ten lower through-holes 38a, 38b. With this arrangement, the seal lip 59 is pressed against the lower wall inner surface 60, thereby providing fluid-tight seal. However, the movable film 42 may be overlapped such that the entire lower surface is remote from the lower wall inner surface 60, or the seal lip 59 may be omitted so that roughly the entire lower surface of the movable film 42 is overlapped in a state of contact on the lower wall inner surface 60.

The partition 26 including the movable film 42 is supported by its outer peripheral end being sandwiched between vertically opposed faces of the lower surface of the main rubber elastic body 16 and the clasping part 18 of the second mounting member 14. With this configuration, the partition 26 is arranged so as to spread in the axis-perpendicular direction in the fluid sealing area 24. The lower surface of the partition 26 and the clasping part 18 of the second mounting member 14 are in contact with each other at their outer peripheral portions, while sandwiching and supporting the outer peripheral end of the flexible film 22 at their radially inner portions.

The fluid sealing area 24 is bifurcated into the upper and lower sides of the partition 26. The upper side of the partition 26 in the fluid sealing area 24 comprises a pressure-receiving chamber 64 serving as a first fluid chamber whose wall portion is partially defined by the main rubber elastic body 16. The pressure-receiving chamber 64 gives rise to internal pressure fluctuations due to elastic deformation of the main rubber elastic body 16 during an input of vibration in the vertical direction. The lower side of the partition 26 in the fluid sealing area 24 comprises an equilibrium chamber 66 serving as a second fluid chamber whose wall portion is partially defined by the flexible film 22. The equilibrium chamber 66 permits changes in volume due to deformation of the flexible film 22 and the internal pressure therein is kept roughly constant. In other words, the partition 26 is disposed between the pressure-receiving chamber 64 and the equilibrium chamber 66. A non-compressible fluid is sealed in the pressure-receiving chamber 64 and the equilibrium chamber 66.

The first circumferential groove 32 of the first partition plate 28 and the second circumferential groove 36 of the second partition plate 30 are connected in series with each other. By the partition 26 being arranged in the fluid sealing area 24, the opening on the outer peripheral side of the first circumferential groove 32 is closed by the second mounting member 14. This configuration provides an orifice passage 68 that interconnects the pressure-receiving chamber 64 and the equilibrium chamber 66 by including the first circumferential groove 32 and the second circumferential groove 36. The orifice passage 68 extends in the outer peripheral portion of the partition 26 in the circumferential direction for a length shorter than twice around the circumference. In the orifice passage 68, the resonance frequency of the flowing fluid is tuned so as to conform to the frequency of vibration to be damped by, for example, adjusting the ratio between the passage cross sectional area and the passage length. The tuning frequency of the orifice passage 68 is set to a low frequency corresponding to, for example, engine shake and the like.

Regarding the movable film 42 housed in the housing area 40 of the partition 26, the liquid pressure of the pressure-receiving chamber 64 is applied to the upper surface, which is the second surface, through the upper through-hole 34, while the liquid pressure of the equilibrium chamber 66 is applied to the lower surface, which is the first surface, through the lower through-holes 38*a*, 38*b*. The elastic deformation zone 50 of the movable film 42 housed in the housing area 40 is remote downward from the upper wall inner surface 62, which is the opposing wall inner surface on the pressure-receiving chamber 64 side, while being overlapped on the lower wall inner surface 60, which is the wall inner surface on the equilibrium chamber 66 side, in a state of contact or with a gap.

In the engine mount 10 constructed in the above manner the first mounting member 12 is mounted on a power unit (not shown) and the second mounting member 14 is mounted on a vehicle body (not shown), for example. Then, a relative differential in liquid pressure is generated between the pressure-receiving chamber 64 and the equilibrium chamber 66 with respect to the vibration input in the vertical direction. When the input vibration has a low frequency, vibration damping effect (high attenuating effect) is exhibited based on the resonance action or the like of the fluid flowing through the orifice passage 68.

The movable film 42 is clasped at the central retainer 44 and the outer peripheral retainers 46, and the free length of the elastic deformation zone 50 is adjusted by the spoke-shaped retainers 48. Therefore, internal pressure fluctuations of the pressure-receiving chamber 64 are produced without being significantly reduced by the deformation of the elastic deformation zone 50, and the fluid flow through the orifice passage 68 is efficiently induced. In particular, since the spoke-shaped retainer 48 is provided by connecting the central retainer 44 and the outer peripheral retainer 46, the deformation rigidity of the spoke-shaped retainer 48 increases, thereby preventing excessive liquid pressure-absorbing action due to the movable film 42. It would also be acceptable that, when the input vibration is a high-frequency, small-amplitude vibration, vibration damping effect (vibration isolation effect) may be attained based on the liquid pressure-absorbing action due to the deformation of the elastic deformation zone 50 of the movable film 42 or the like.

When the liquid pressure in the pressure-receiving chamber 64 drops significantly with respect to the liquid pressure in the equilibrium chamber 66, the elastic deformation zone 50 of the movable film 42 greatly deforms in the direction away from the lower wall inner surface 60 of the housing area 40, and in particular, the relief part 52 becomes spaced away from the lower wall inner surface 60. This interconnects the pressure-receiving chamber 64 and the equilibrium chamber 66 through the upper and lower through-holes 34, 38*a*, 38*b* and the housing area 40, and fluid flow will be produced from the equilibrium chamber 66 to the pressure-receiving chamber 64, thereby rapidly eliminating pressure drop in the pressure-receiving chamber 64 with respect to the equilibrium chamber 66. As a result, generation of cavitation bubbles due to significant pressure drop in the pressure-receiving chamber 64 is avoided, thereby preventing generation of noise due to the cavitation.

When the liquid pressure in the pressure-receiving chamber 64 drops significantly with respect to the liquid pressure in the equilibrium chamber 66 and the elastic deformation zone 50 of the movable film 42 greatly deforms, the deformed elastic deformation zone 50 comes into contact with the upper wall inner surface 62 of the housing area 40. In this case, the cushion ridge 54 effectively reduces the striking noises.

Figure 7A:
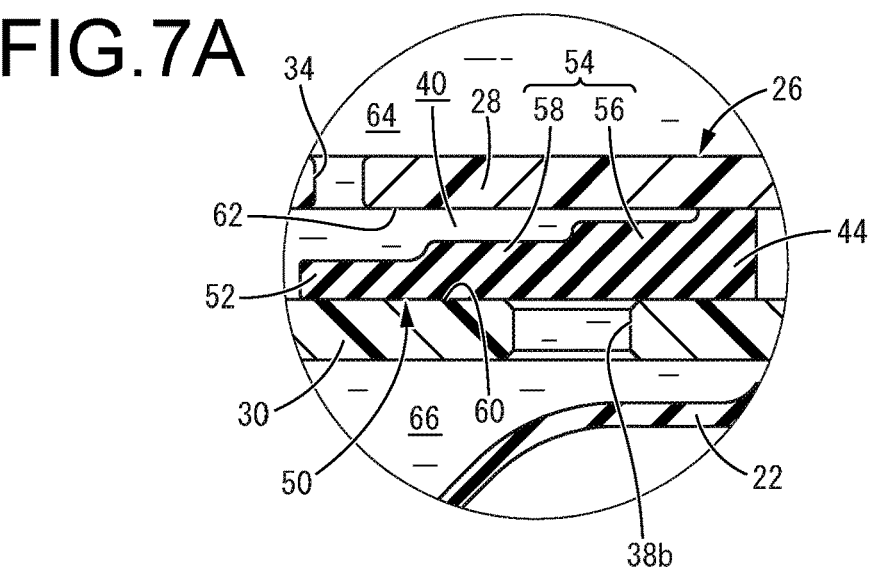
Figure 7B:
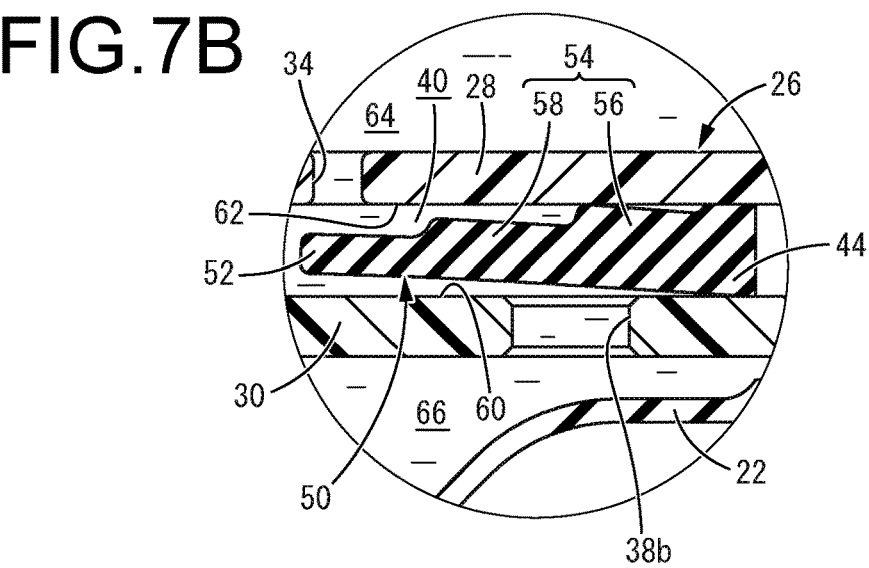

Specifically, when the liquid pressure of the pressure-receiving chamber 64 significantly drops and the elastic deformation zone 50 of the movable film 42 undergoes significant elastic deformation from the initial state shown in FIG. 7A, the elastic deformation zone 50 approaches and comes into contact with the upper wall inner surface 62 of the housing area 40. At this time, due to progressive increase in the amount of elastic deformation of the elastic deformation zone 50, as shown in FIG. 7B, first, the first contact part 56 of the cushion ridge 54 comes into contact with the upper wall inner surface 62 of the housing area 40. By so doing, the movable film 42 partially comes into contact with the upper wall inner surface 62 at the first contact part 56, so that impact at the time of contact is reduced, thereby preventing the generation of striking noises. Moreover, since the first contact part 56 is provided on the radially inner portion of the elastic deformation zone 50 and the displacement speed is slower than that of the outer peripheral portion of the elastic deformation zone 50, the striking noise at the time of contact is less likely to become a problem. Furthermore, since the first contact part 56 has roughly the same width dimension as that of the second contact part 58 but has a larger projection height, deformation spring characteristics can be set to be soft.

Figure 7C:
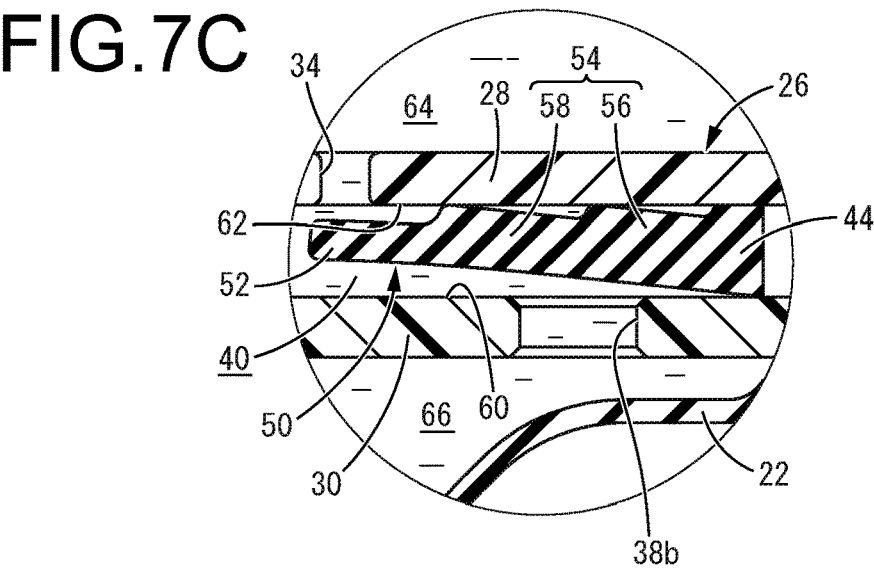

Next, when the elastic deformation zone 50 further elastically deforms, as shown in FIG. 7C, the elastic deformation zone 50 comes into contact with the upper wall inner surface 62 of the housing area 40 not only at the first contact part 56 but also at the second contact part 58. In this way, since the projection heights of the first contact part 56 and the second contact part 58 are different from each other, the timing of contact with the upper wall inner surface 62 of the housing area 40 varies depending on the amount of deformation of the elastic deformation zone 50. Besides, the displacement speed of the second contact part 58 due to the deformation of the elastic deformation zone 50 has been reduced in advance by the contact of the first contact part 56 with the upper wall inner surface 62. This reduces impact caused by the contact of the second contact part 58 with the upper wall inner surface 62.

After the first contact part 56 comes into contact with the upper wall inner surface 62, the second contact part 58 comes into contact with the upper wall inner surface 62, so that the contact area of the movable film 42 with respect to the upper wall inner surface 62 increases in a stepwise manner. This makes it possible to efficiently reduce the deformation speed of the elastic deformation zone 50 while ameliorating the impact at the time of contact. By so doing, even when the portion of the elastic deformation zone 50 that is away from the first contact part 56 and the second contact part 58 comes into contact with the upper wall inner surface 62, the impact at the time of contact is sufficiently ameliorated, thereby reducing the striking noises.

In the cushion ridge 54, the second contact part 58 having a small projection height is provided on the radially outer side of the elastic deformation zone 50 with respect to the first contact part 56 having a large projection height. Therefore, after the first contact part 56 comes into contact with the upper wall inner surface 62 in the radially inner portion of the elastic deformation zone 50 where the displacement speed due to elastic deformation is low, the second contact part 58 comes into contact with the upper wall inner surface 62 in the outer peripheral portion of the elastic deformation zone 50. This reduces the displacement speed due to the elastic deformation in the outer peripheral portion of the elastic deformation zone 50 where the displacement speed due to the elastic deformation is likely to increase, thereby preventing the generation of striking noises.

Besides, since the cushion ridge 54 includes the first contact part 56 and the second contact part 58 having different heights, it is also possible to change the dynamic spring characteristics of the movable film 42 in a stepwise manner depending on the difference in amplitude of the input vibration. Specifically, at the time of vibration input having an amplitude by which neither the first contact part 56 nor the second contact part 58 comes into contact with the upper wall inner surface 62 of the housing area 40, the entire elastic deformation zone 50 deforms, so as to exhibit softer dynamic spring characteristics. At the time of vibration input having an amplitude by which the first contact part 56 comes into contact with the upper wall inner surface 62 but the second contact part 58 does not come into contact with the upper wall inner surface 62, the deformation of the elastic deformation zone 50 is restrained in the radially inner portion, so as to exhibit harder dynamic spring characteristics than in the state where the first contact part 56 is remote from the upper wall inner surface 62. At the time of vibration input having an amplitude by which both the first contact part 56 and the second contact part 58 come into contact with the upper wall inner surface 62, the deformation of the elastic deformation zone 50 is restrained over a wider range in the long-side direction. This exhibits harder dynamic spring characteristic than in the state where the second contact part 58 is remote from the upper wall inner surface 62.

The cushion ridge 54 extends toward the relief part 52 provided circumferentially between the pair of outer peripheral retainers 46, 46. With this configuration, in the portion on which deformation restraint due to the pair of outer peripheral retainers 46, 46 is difficult to exert, the striking noise at the time of contact is prevented by the stepwise contact of the cushion ridge 54 or the like.

The movable film 42 has a rounded rectangular plate shape having a long-side direction and a short-side direction. The cushion ridge 54 is provided so as to extend in the long-side direction of the movable film 42. With this configuration, in the long-side direction in which the amount of deformation is likely to be large because the free length is longer than that in the short-side direction, the cushioning action by the cushion ridge 54 is exerted, thereby reducing the striking noises due to strike of the movable film 42 against the upper wall inner surface 62.

Figure 8:
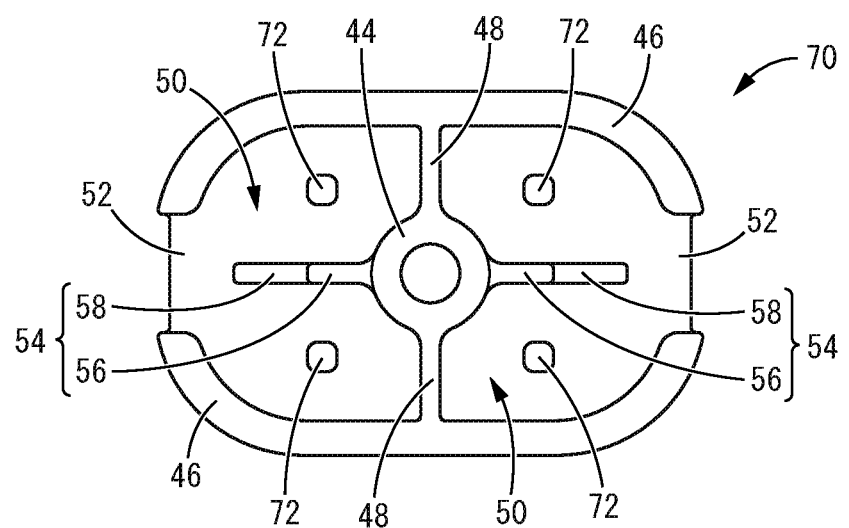
FIG. 8 is a top plan view of a movable film of an engine mount according to another practical embodiment of the present invention.

It would also be possible to adopt a structure like a movable film 70 shown in FIG. 8. In the following description, components and parts that are substantially identical with those in the preceding first practical embodiment will be assigned like symbols and not described in any detail.

The movable film 70 includes cushion protrusions 72 each provided circumferentially between the spoke-shaped retainer 48 and the cushion ridge 54. The cushion protrusion 72 has a pillar shape and protrudes upward in the elastic deformation zone 50. In plan view shown in FIG. 8, the cushion protrusion 72 is provided independently at a position away from any of the central retainer 44, the outer peripheral retainers 46, 46, the spoke-shaped retainers 48, 48, and the cushion ridges 54, 54.

The movable film 70 is housed in a housing area of a partition (not shown). Then, when the movable film 70 undergoes a large elastic deformation upward, not only do the first contact part 56 and the second contact part 58 of the cushion ridge 54 come into contact with the upper wall inner surface of the housing area (not shown) in a stepwise manner, but also the cushion protrusion 72 comes into contact with the upper wall inner surface of the housing area separately from the cushion ridge 54. That is, by the first contact part 56, the second contact part 58, and the cushion protrusion 72 coming into contact in a stepwise manner, the contact occurs in three steps. In this way, by providing the cushion protrusion 72 in addition to the cushion ridge 54 having the first contact part 56 and the second contact part 58 that come into contact in a stepwise manner, the impact at the time of contact is further ameliorated, thereby effectively reducing the striking noises.

For example, by providing various types of the cushion protrusions having mutually different projection heights, it is also possible to realize more excellent cushioning action and the like. The shape of the cushion protrusion is not limited to a pillar shape, but may be, for example, a tubular shape, or a ridge extending with a certain length.

Figure 9:
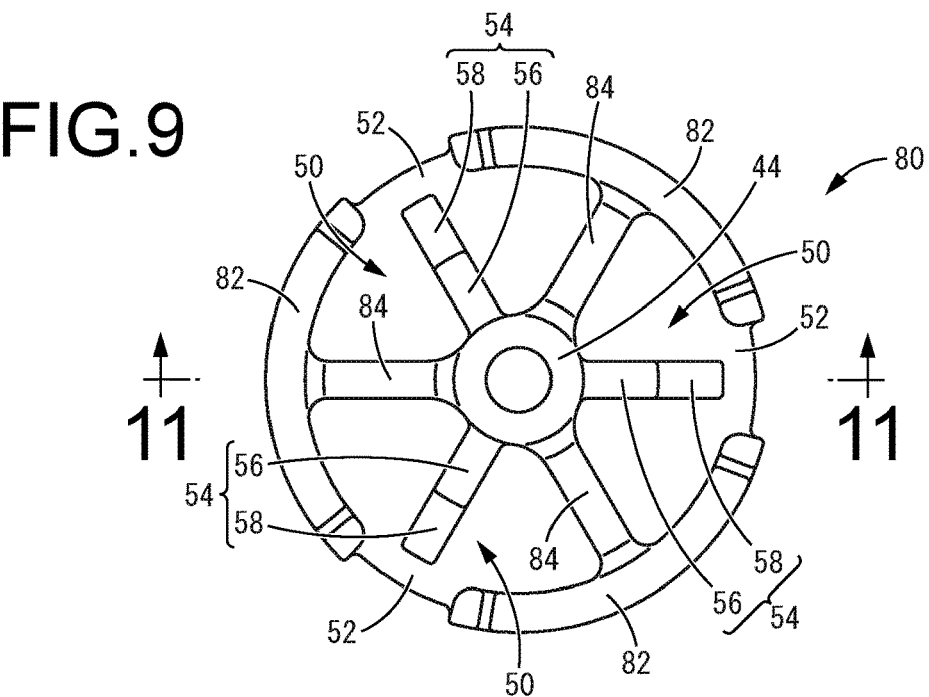
FIG. 9 is a top plan view of a movable film adopted by an engine mount according to yet another practical embodiment of the present invention.
Figure 10:
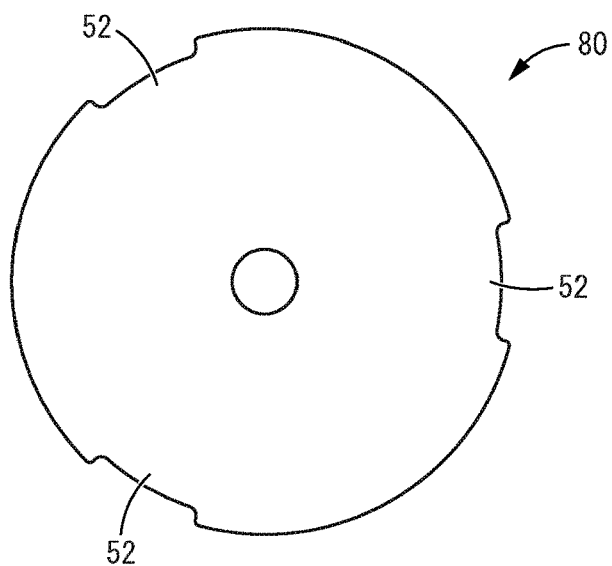
FIG. 10 is a bottom plan view of the movable film shown in FIG. 9.
Figure 11:
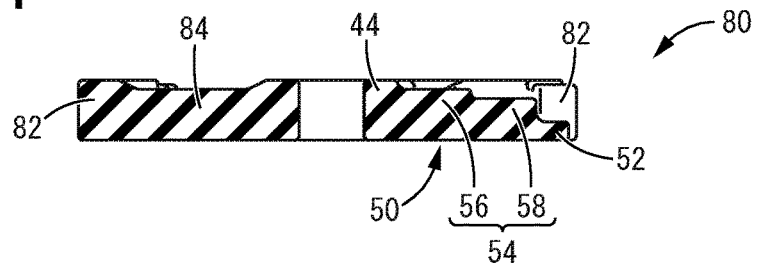
FIG. 11 is a cross sectional view taken along line 11-11 of FIG. 9.

FIGS. 9 to 11 depict a movable film 80 for use in an engine mount according to another practical embodiment of the present disclosure. The movable film 80 has a circular disk shape overall. The movable film 80 includes three outer peripheral retainers 82, 82, 82 on its outer peripheral portion. The outer peripheral retainers 82 are ridges that project upward and extend in the circumferential direction, and are arranged at regular intervals in the circumferential direction. The movable film 80 includes spoke-shaped retainers 84 extending radially outward from the central retainer 44. The spoke-shaped retainer 84 projects upward and extends in the radial direction. In the spoke-shaped retainer 84, the opposite ends in the radial direction are connected to the central retainer 44 and the outer peripheral retainer 82, so that the spoke-shaped retainer 84 connects the central retainer 44 and the circumferentially central portion of the outer peripheral retainer 82 in the radial direction.

In the movable film 80, the zone away from the central retainer 44, the three outer peripheral retainers 82, 82, 82, and the three spoke-shaped retainers 84, 84, 84 serves as the elastic deformation zone 50. The relief parts 52 that constitute the elastic deformation zone 50 are provided circumferentially between the three outer peripheral retainers 82, 82, 82.

The elastic deformation zone 50 includes cushion ridges 54. Each cushion ridge 54 projects upward, and is provided circumferentially between the two spoke-shaped retainers 84, 84, while extending radially outward from the central retainer 44. The cushion ridge 54 extends from the central retainer 44 toward the relief part 52 that is away from the outer peripheral retainer 82 in the circumferential direction. There are provided three cushion ridges 54 in a spoke-wise fashion.

Even with such a movable film 80 of circular disk shape, by the first contact part 56 and the second contact part 58 of the cushion ridge 54 sequentially coming into contact with the partition that constitutes the housing area (not shown), the striking noises at the time of contact will be reduced.

While the present invention has been described in detail hereinabove in terms of the practical embodiments, the invention is not limited by the specific disclosures thereof. For example, the number and arrangement of the cushion ridges are not particularly limited. Moreover, the cushion ridge is not necessarily limited to a shape that extends straightly, but may curve or bend to extend. Furthermore, the width dimension of the cushion ridge may vary, and for example, it would also be acceptable to adopt a structure in which the width dimension decreases radially outward in a stepwise or progressive manner.

In the case where the movable film has a rounded rectangular plate shape with a long-side direction and a short-side direction, or an oval plate shape with a major axis direction and a minor axis direction, the direction in which the cushion ridge 54 extends is not necessarily limited to the long-side direction (the major axis direction). For example, the cushion ridge 54 may extend in the direction of inclination with respect to the long-side direction, or may extend in the short-side direction.

In the preceding practical embodiments, the projection height of the cushion ridge 54 decreases in a stepwise manner radially outward from the central retainer 44. However, it would be acceptable as long as the cushion ridge 54 includes a plurality of portions having mutually different projection heights. For example, the projection height may increase in a stepwise manner radially outward. Moreover, the cushion ridge may include a plurality of portions having mutually the same projection height dimensions.

The preceding practical embodiments illustrated the cushion ridge 54 of a two-step structure including the first contact part 56 and the second contact part 58 having mutually different projection heights, but the cushion ridge may include three or more portions having mutually different projection heights. In the cushion ridge having the three or more portions having mutually different projection heights, the projection height does not necessarily increase or decrease from the radially inner side toward the radially outer side. As a specific example, in the cushion ridge having three portions having mutually different projection heights, the intermediate portion may be the portion having the greatest projection height or the portion having the lowest projection height.

The portion of the cushion ridge 54 having the maximum projection height may have a projection height roughly the same as that of the central retainer 44 and the outer peripheral retainer 46.

Figure 12:
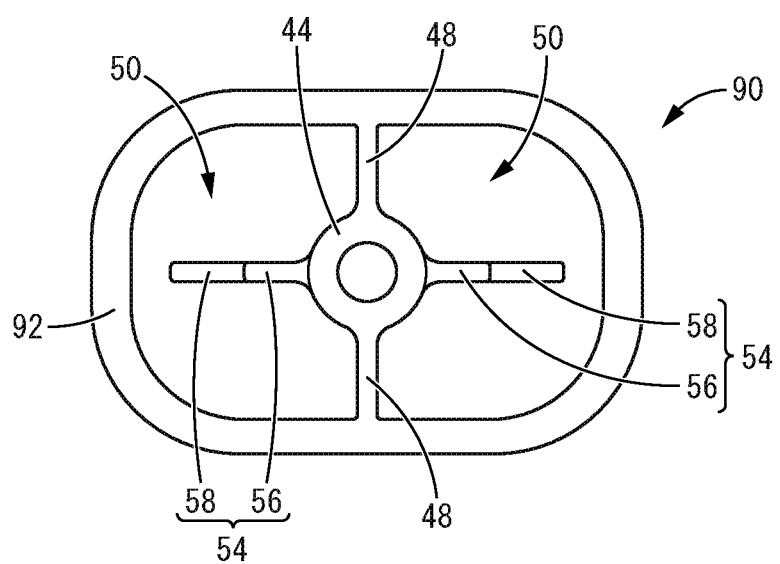
FIG. 12 is a top plan view of a movable film adopted by an engine mount according to still yet another practical embodiment of the present invention.

In the preceding practical embodiment, there are provided two outer peripheral retainers 46, 46 that are circumferentially remote from each other. However, for example, like a movable film 90 shown in FIG. 12, it would also be possible to adopt an annular outer peripheral retainer 92 that is continuous about the entire circumference. Instead, four or more outer peripheral retainers 46 may be provided. Besides, the outer peripheral retainer 46 is not essential but may be omitted. Incidentally, in the embodiment adopting the annular outer peripheral retainer 92 that is continuous about the entire circumference as shown in FIG. 12, the outer peripheral portion of the first surface of the movable film 90 is always maintained in a state of contact with the lower wall inner surface 60 of the housing area 40, so that the pressure-receiving chamber 64 and the equilibrium chamber 66 are physically partitioned by the movable film 90. However, based on the elastic deformation of the elastic deformation zone 50 located in the radially middle portion, fluid flow through the upper and lower through-holes 34, 38a, 38b is allowed so as to permit relative volume changes between the pressure-receiving chamber 64 and the equilibrium chamber 66, thereby obtaining vibration damping effect based on the fluid flow.

In the state where the movable film is arranged in the housing area of the partition, for example, the entire movable film except the central retainer may be remote from both the upper and lower wall inner surfaces of the housing area. With this configuration, the elastic deformation zone of the movable film is allowed to deform to both the upper and lower sides with respect to the vibration input in the vertical direction, thereby enabling tuning and the like for more efficiently obtaining vibration isolation effect and the like due to liquid pressure-absorption action.

What is claimed is:

1. A fluid-filled vibration damping device comprising:
   a first fluid chamber;
   a second fluid chamber;
   a partition having a housing area and arranged between the first fluid chamber and the second fluid chamber; and
   a movable film having a first surface and a second surface while being housed in the housing area, the movable film comprising:
   a central retainer sandwiched and held by the partition;
   a plurality of spoke-shaped retainers extending radially outward from the central retainer, the first surface of the movable film being held in a state of being overlapped on a wall inner surface of the housing area of the partition by the central retainer and the spoke-shaped retainers;
   an elastic deformation zone provided circumferentially between the spoke-shaped retainers, the elastic deformation zone being allowed to deform in a direction away from the wall inner surface of the housing area on which the movable film is overlapped based on a differential of fluid pressures applied to the first surface and the second surface of the movable film; and
   a cushion ridge provided in the elastic deformation zone, the cushion ridge projecting from the second surface of the movable film while extending radially outward from the central retainer, wherein a projection height of the cushion ridge is varied in a direction of extension of the cushion ridge such that a timing of contact with an opposing wall inner surface in the housing area varies depending on an amount of deformation of the elastic deformation zone.

2. The fluid-filled vibration damping device according to claim 1, wherein
the movable film further comprises an outer peripheral retainer provided in an outer peripheral portion thereof while extending in a circumferential direction, the outer peripheral retainer being sandwiched and held by the partition, and
the spoke-shaped retainers connect the central retainer and the outer peripheral retainer.

3. The fluid-filled vibration damping device according to claim 1, wherein the projection height of the cushion ridge decreases in a stepwise manner toward a radially outer side of the movable film.

4. The fluid-filled vibration damping device according to claim 1, wherein
the movable film further comprises an outer peripheral retainer provided partially in an outer peripheral portion thereof while extending in a circumferential direction, the outer peripheral retainer being sandwiched and held by the partition, and
the cushion ridge extends from the central retainer toward a portion circumferentially away from the outer peripheral retainer.

5. The fluid-filled vibration damping device according to claim 1, wherein
the first fluid chamber comprises a pressure-receiving chamber that gives rise to internal pressure fluctuations during an input of vibration, while the second fluid chamber comprises an equilibrium chamber that permits changes in volume, and
the movable film is overlapped on the wall inner surface on a side of the equilibrium chamber in the housing area, while the elastic deformation zone of the movable film is remote from the opposing wall inner surface on a side of the pressure-receiving chamber in the housing area.

6. The fluid-filled vibration damping device according to claim 1, wherein the movable film has a quadrangular plate shape.

7. The fluid-filled vibration damping device according to claim 1, wherein the movable film has a circular disk shape.

8. The fluid-filled vibration damping device according to claim 1, wherein a cushion protrusion is provided in the elastic deformation zone, the cushion protrusion being independent of the central retainer and the cushion ridge.

* * * * *